J. HARRIS & W. K. PATRICK.
Wagon-Axle Cutter.
No. 224,824.  Patented Feb. 24, 1880.
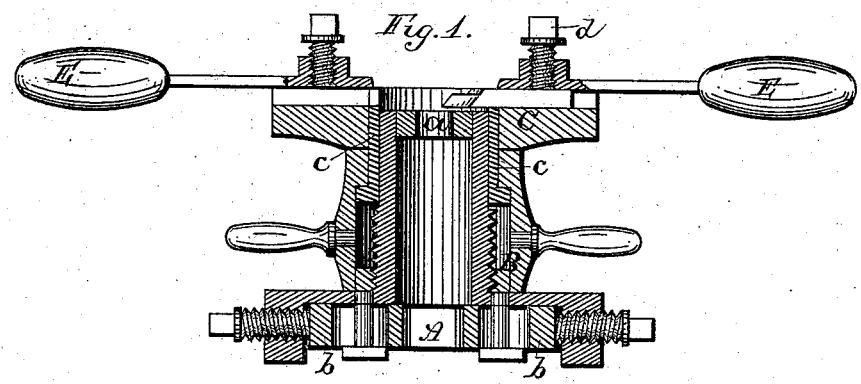
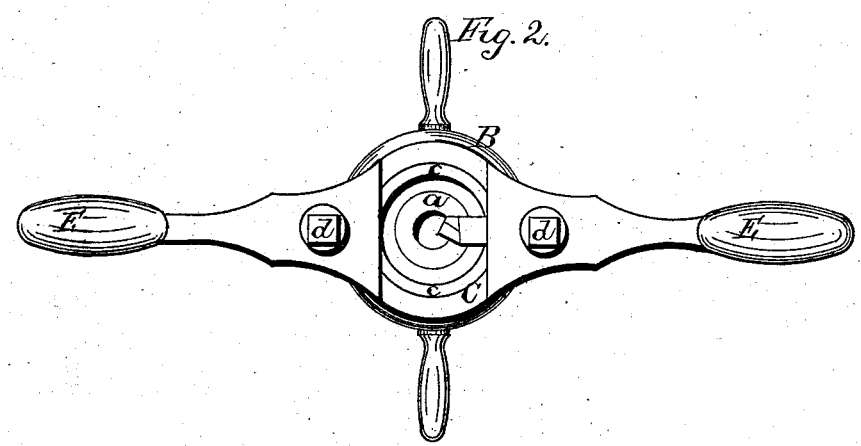
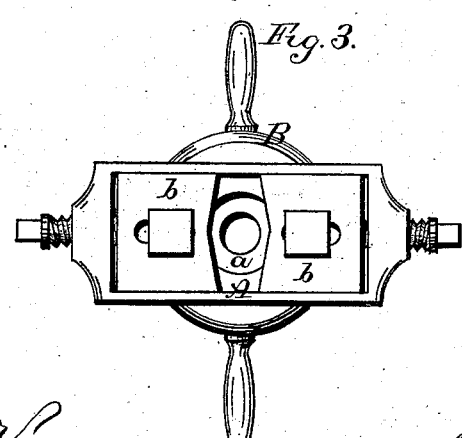
Witnesses:
J. W. Garner
W. S. D. Hames
Inventors:
John Harris
Wm K. Patrick
per C. E. Allen, Atty

UNITED STATES PATENT OFFICE.

JOHN HARRIS AND WILLIAM K. PATRICK, OF HINESBURG, VERMONT.

WAGON-AXLE CUTTER.

SPECIFICATION forming part of Letters Patent No. 224,824, dated February 24, 1880.

Application filed August 7, 1879.

*To all whom it may concern:*

Be it known that we, JOHN HARRIS and WILLIAM K. PATRICK, both of the town of Hinesburg, in the county of Chittenden and State of Vermont, have invented certain new and useful Improvements in Wagon-Axle Cutters; and we do hereby declare that the following is a full, clear, and exact description of the invention, which will enable others skilled in the art to which it appertains to make and use the same, reference being had to the accompanying drawings, and to letters of reference marked thereon, which form a part of this specification.

In the drawings, Figure 1 is a vertical section of our invention. Fig. 2 is a top-plan view, and Fig. 3 is a bottom-plan view, of the same.

Our machine is intended to cut back the faces of both the front and back shoulders of a wagon-axle when, by wear or otherwise, they are uneven or do not fit the box of the wheel.

A is a chuck, one end of which is expanded to receive the movable jaws $b\ b$. The other end is fitted to receive a removable collar, $a$. A thread is cut upon the exterior of the chuck to fit the corresponding screw in the feed-wheel B, which is connected with the face-plate C by a sleeve, $c$, which fits a corresponding flange in the feed-wheel. The face-plate is provided with a movable cutting-tool, which is readily adjusted to the portion to be cut away by the set-screws $d$. The face-plate is revolved by the handles E E. Each chuck is furnished with a set of collars, $a$, to fit axles of different sizes.

In operation, a collar, $a$, selected of proper size to fit the axle to be cut, is first placed in the chuck A, to which it may be fastened by a set-screw. The chuck is then inserted into the feed-wheel B. The machine is then put on the wagon-axle as far as the collar $a$ will permit, and the chuck is there made fast to the axle by tightly adjusting the jaws $b\ b$. The feed-wheel is then screwed up upon the chuck until the cutting-tool touches the face of the shoulder to be cut away. The face-plate C is then made to revolve by its handles E E, the feed-wheel being gradually turned up as the cutting progresses, thus keeping the cutting-tool constantly in contact with the part to be cut.

When the portion of the axle to be removed has been cut away the feed-wheel should be held stationary and a few revolutions of the cutting-tool made, so as to leave a smooth polished surface on the face of the shoulder of the wagon-axle.

To cut the shoulder at the back of the axle the machine is to be used in a manner similar to the foregoing, excepting that its position on the axle should be reversed, so that the face-plate and cutting-tool will be in contact with the back shoulder of the axle, and the chuck made fast between it and the outer end of the axle. It will also be necessary, in this position of the face-plate, to reverse the position of the cutting-tool therein.

The cutting-tool being exposed, its operation can be readily watched and the cutting ceased precisely at the desired point.

When the cutting of the shoulders of the axle is completed the thread of the axle-screw may be continued as far as necessary by readjusting the machine so that the cutting-tool will cut away such portion as may be required for this purpose.

The end of the axle can be trimmed off in a similar manner.

What we claim is—

1. The chuck A, provided with movable jaws $b\ b$, adjusted by set-screws, and fitted to receive a removable collar, $a$, in combination with the sleeve $c$ and the feed-wheel B, screwed upon it, for the purpose and substantially as described.

2. The combination, with the chuck, of the face-plate C, feed-wheel B, sleeve $c$, and removable cutting-tool, the parts being arranged to operate substantially as shown.

3. The combination of the chuck A, for attaching the machine to the axle, the removable collar, sleeve $c$, feed-wheel, and face-plate, arranged substantially as described, and for the purpose set forth.

In testimony that we claim the foregoing as our own we affix our signatures in presence of two witnesses.

JOHN HARRIS.
WILLIAM K. PATRICK.

Witnesses:
JAMES LEWIS,
CHARLES E. ALLEN.